(12) United States Patent
Trebilcock

(10) Patent No.: US 10,774,497 B1
(45) Date of Patent: Sep. 15, 2020

(54) SOIL EROSION BARRIER

(71) Applicant: Mark Trebilcock, Saugus, CA (US)

(72) Inventor: Mark Trebilcock, Saugus, CA (US)

( * ) Notice: Subject to any disclaimer, the term of this patent is extended or adjusted under 35 U.S.C. 154(b) by 159 days.

(21) Appl. No.: 16/028,330

(22) Filed: Jul. 5, 2018

(51) Int. Cl.
*E02D 17/20* (2006.01)
*A01G 9/28* (2018.01)

(52) U.S. Cl.
CPC .............. *E02D 17/202* (2013.01); *A01G 9/28* (2018.02); *E02D 17/205* (2013.01)

(58) Field of Classification Search
CPC ................ E02D 17/202; E02D 17/205; E02D 29/0225–0291; E02B 3/122; E02B 3/126; B65D 3/04; B65D 3/06; B65D 3/10–20; B65D 5/0209; B65D 5/10; B65D 5/103; B65D 5/106; A01G 9/28
See application file for complete search history.

(56) References Cited

U.S. PATENT DOCUMENTS

| | | | | |
|---|---|---|---|---|
| 4,809,460 A * | 3/1989 | Futch | ........................ | A01G 9/28 47/33 |
| 5,503,324 A * | 4/1996 | Bacchetti | ............... | B65D 71/36 229/112 |
| 5,862,629 A * | 1/1999 | Sulyman | ................. | E02D 17/20 47/66.1 |
| 5,967,701 A * | 10/1999 | Berkley | .................... | E02D 5/03 405/274 |
| 6,523,300 B2 * | 2/2003 | Smith | ...................... | A01G 9/28 47/32.7 |
| 8,528,249 B1 * | 9/2013 | Kao | ......................... | A01G 9/28 47/33 |
| 10,633,140 B1 * | 4/2020 | Vergara | .................. | B65D 85/70 |
| 2003/0024157 A1 * | 2/2003 | Conde | ...................... | A01G 9/28 47/33 |
| 2007/0107301 A1 * | 5/2007 | Meyers | ..................... | A01G 9/28 47/32.8 |
| 2011/0086189 A1 * | 4/2011 | Bigger | ................ | E02D 29/0291 428/33 |
| 2015/0251797 A1 * | 9/2015 | Carman | ................. | B65D 5/304 229/148 |
| 2016/0347496 A1 * | 12/2016 | Carman | .................. | B65D 5/003 |
| 2017/0118920 A1 * | 5/2017 | Stewart | .................... | A01G 9/28 |

FOREIGN PATENT DOCUMENTS

JP              57201425 A  * 12/1982  .......... E02D 17/202

* cited by examiner

*Primary Examiner* — Frederick L Lagman
*Assistant Examiner* — Stacy N Lawson
(74) *Attorney, Agent, or Firm* — Gulf Coast Intellectual Property Group

(57) ABSTRACT

A soil erosion barrier that is configured to inhibit the erosion of soil on a sloped terrain. The soil erosion barrier includes a body that is planar in manner and manufactured from a flexible material. The body includes an upper edge and a lower edge wherein the lower edge is contoured towards opposing ends of the body with the greatest width of the body being at the midpoint thereof. A first connection member is integrally formed on one end of the body and a second connection member is integrally formed on the opposing end of the body. An aperture is formed through the body proximate the second end wherein the aperture further includes opposing slots that are parallel to the upper edge of the body. A slot is formed in the body proximate the midpoint and is further proximate the lower edge.

3 Claims, 4 Drawing Sheets

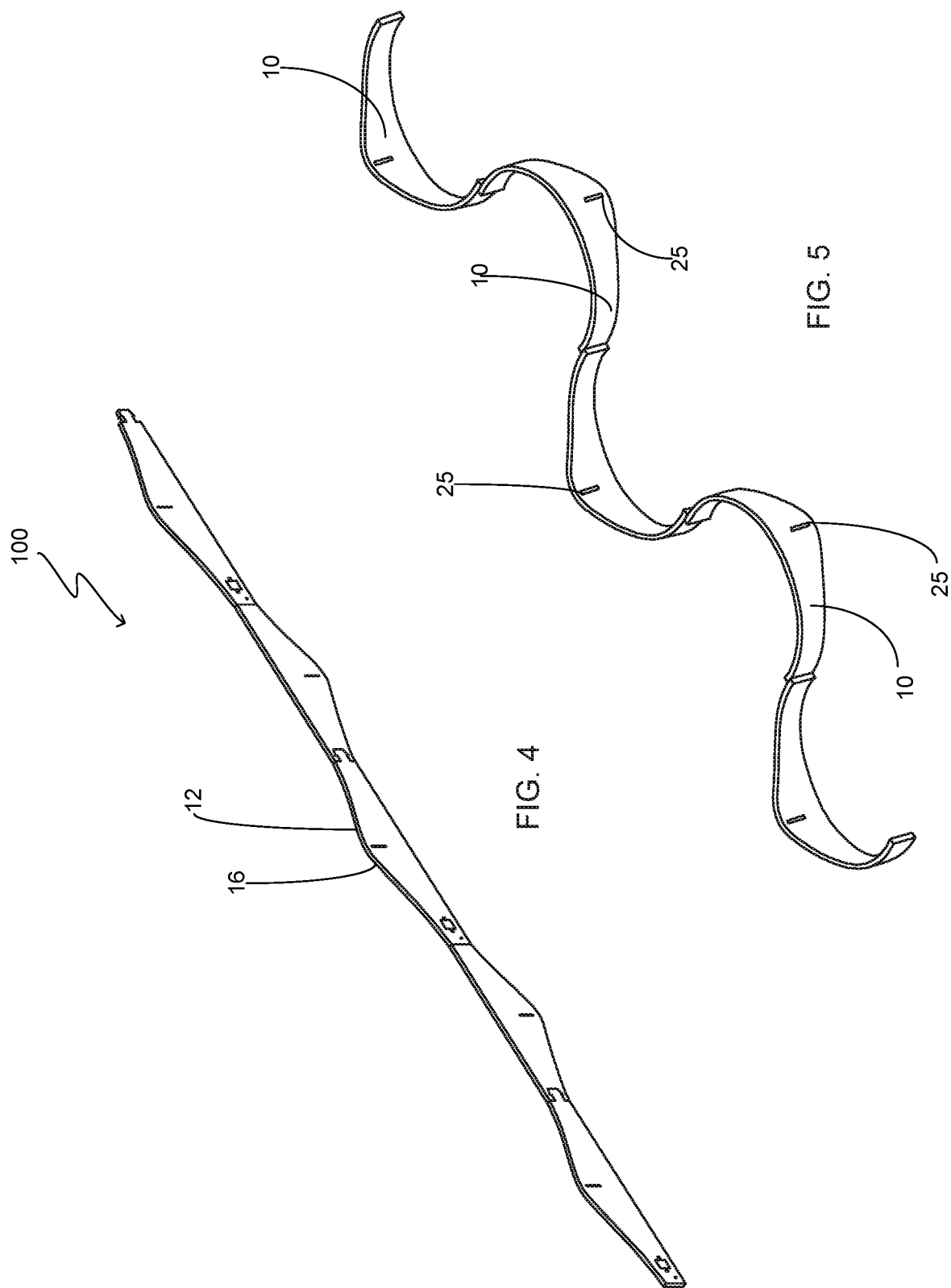

SOIL EROSION BARRIER

PRIORITY UNDER 35 U.S.C SECTION 119(e) & 37 C.F.R. SECTION 1.78

This nonprovisional application claims priority based upon the following prior United States Provisional Patent Application entitled: Soil Erosion Barrier, Application No.: 62/529,424 filed Jul. 6, 2017, in the name of Mark Trebilcock, which is hereby incorporated by reference for all purposes.

FIELD OF INVENTION

The present invention relates generally to agriculture products, more specifically but not by way of limitation, a soil erosion barrier that is configured to facilitate the creation of at least one area on a sloped terrain that provides a more suitable environment for growing plants, trees, shrubs and the like. Furthermore, the present invention can be utilized to create a raised garden on a flat terrain.

BACKGROUND

Much of the terrain in parts of the world is sloped. Whether its hillsides or steeper terrain such as the lower portion of a mountain, millions of individuals live adjacent to or on terrain that has a slope. The sloped terrain can be utilized to plant trees, bushes, etc., for either commercial or personal reasons. Crops such as coffee and grapes are often planted on hillsides or other sloped terrain. Many homeowners that live on slope terrains will often attempt to install ornamental landscaping on the terrain to provide aesthetic improvement.

One problem with installing landscaping or the like on sloped terrain is the control of the loss of soil and irrigation water. Without any prevention techniques, the soil on a sloped terrain will naturally erode away due to precipitation and other natural forces such as but not limited to wind. Additionally, retention of water for plants on a sloped terrain is a challenge. Common solutions that are known in the art to address the soil erosion problem are items such as but not limited to conventional landscaping bricks. These bricks are superposed the sloped terrain and stacked in a vertical manner so as to provide an area for plants and trees. One problem with bricks and the like is the amount of space required for installation. Further, landscaping bricks are costly and typically require additional work for installation. Lastly, conventional landscaping bricks do not extend beneath the surface, which restricts their ability to prevent soil erosion underneath the installation.

Additional limitations with existing technology include the inability for conventional landscaping edging products to successfully prevent soil erosion on a sloped terrain. As is known in the art, there are many varieties of landscaping edging products but all are linear in configuration with parallel upper and lower edges. The aforementioned characteristics do not provide effective soil erosion control or water management when installed on sloped terrain.

Accordingly, there is a need for a soil erosion barrier that is configured to create at least one planting area on a sloped terrain wherein the soil erosion barrier is operable to inhibit soil erosion.

SUMMARY OF THE INVENTION

It is the object of the present invention to provide a soil erosion and water management barrier that is configured to create at least one planting area on a sloped terrain wherein the soil erosion barrier includes a body that is planar in manner and manufactured from a flexible material.

Another object of the present invention is to provide a soil erosion barrier that is operable to inhibit soil erosion on a sloped terrain wherein the body includes an upper edge and a lower edge.

A further object of the present invention is to provide a soil erosion barrier that is configured to create at least one planting area on a sloped terrain wherein the body further includes a first end and a second end.

Still another object of the present invention is to provide a soil erosion and water management barrier that is operable to inhibit soil erosion on a sloped terrain wherein the lower edge of the body is contoured in shape with the lower edge having its greatest distance from the upper edge proximate the middle of the body.

An additional object of the present invention is to provide a soil erosion barrier that is configured to create at least one planting area on a sloped terrain wherein the body further includes a slot formed therein proximate the middle of the body.

Yet a further object of the present invention is to provide a soil erosion and water management barrier that is operable to inhibit soil erosion on a sloped terrain wherein the first end of the body includes a neck-like portion wherein the neck-like portion has a width that is less than that of the adjacent first end.

Another object of the present invention is to provide a soil erosion barrier that is configured to create at least one planting area on a sloped terrain wherein the first end further includes a connection wing that is integrally formed with the neck like portion distal to the body of the first end.

An alternate object of the present invention is to provide a soil erosion barrier that is operable to inhibit soil erosion on a sloped terrain wherein the second end further includes an upper notch and a lower notch that provide the function of facilitating the stacking and/or securing of more than one soil erosion barrier.

Still a further object of the present invention is to provide a soil erosion barrier that is configured to create at least one planting area on a sloped terrain wherein the second end of the body of the soil erosion barrier includes beveled upper and lower corners.

An additional object of the present invention is to provide a soil erosion barrier that is operable to inhibit soil erosion on a sloped terrain wherein the body further includes an aperture, said aperture configured to receive the first end of the body therethrough, said aperture being proximate the second end of the body.

A further object of the present invention is to provide a soil erosion barrier that is configured to create at least one planting area on a sloped terrain wherein the aperture is square in shape and further includes opposing receiving slots formed therewith on opposite sides thereof.

An alternative objective of the present invention is to provide a soil erosion barrier that is operable to inhibit soil erosion on a sloped terrain wherein the soil erosion barrier is manufactured in alternate sizes.

Another object of the present invention is to provide a soil erosion barrier that is configured to create at least one planting area on a sloped terrain wherein the soil erosion barrier is configured to be operably coupled to a plurality of additional soil erosion barriers so as to form a multitude of planting area of alternate sizes and shapes.

Yet a further object of the present invention is to provide a soil erosion barrier that is operable to inhibit soil erosion on a sloped terrain wherein the soil erosion barrier is manufactured from a lightweight material.

Still a further object of the present invention is to provide a soil erosion barrier that is configured to create at least one planting area on a sloped terrain wherein the contoured lower edge extends beneath the surface of the soil so as to inhibit erosion underneath the body of the soil erosion barrier.

An additional objective of the present invention is to provide a soil erosion barrier that is operable to inhibit soil erosion on a sloped terrain wherein multiple soil erosion barriers are operably coupled without the requirement of tools or adhering elements.

A further object of the present invention is to provide a soil erosion barrier that is configured to create at least one planting area on a sloped terrain wherein the body of the soil erosion barrier can be inserted into the ground so as to maintain the upper edge of the body above the surface of the sloped terrain.

Yet a further object of the present invention is to provide a soil erosion barrier that is operable to inhibit soil erosion and water loss on a sloped terrain wherein the body of the soil erosion barrier is configurable to create numerous alternate designs and planting areas upon being coupled with additional soil erosion barriers.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 4 is an alternative exemplary configuration of the present invention; and

FIG. 5 is an alternative configuration of the present invention.

DETAILED DESCRIPTION

Figure 1:
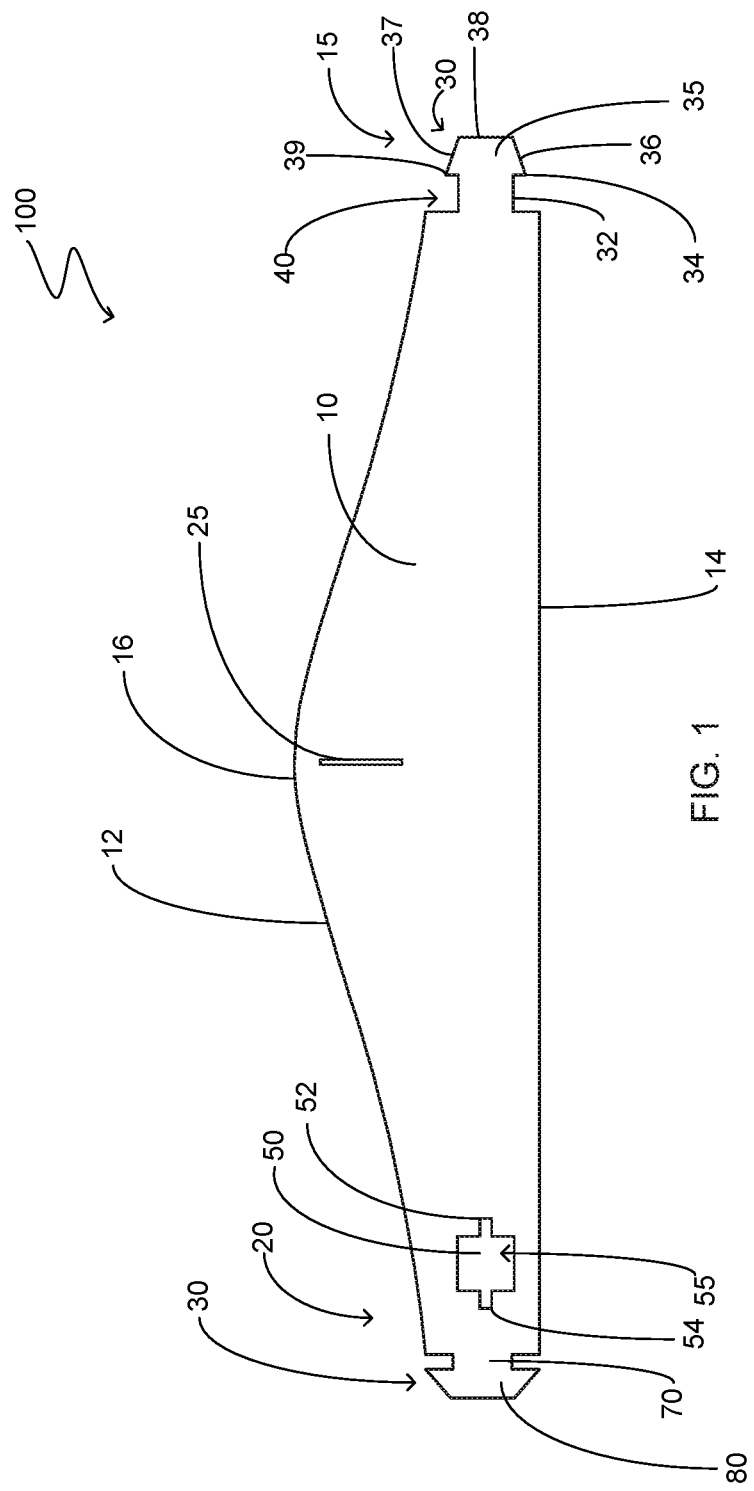
FIG. 1 is a front plan view of an embodiment of the present invention.
Figure 2:
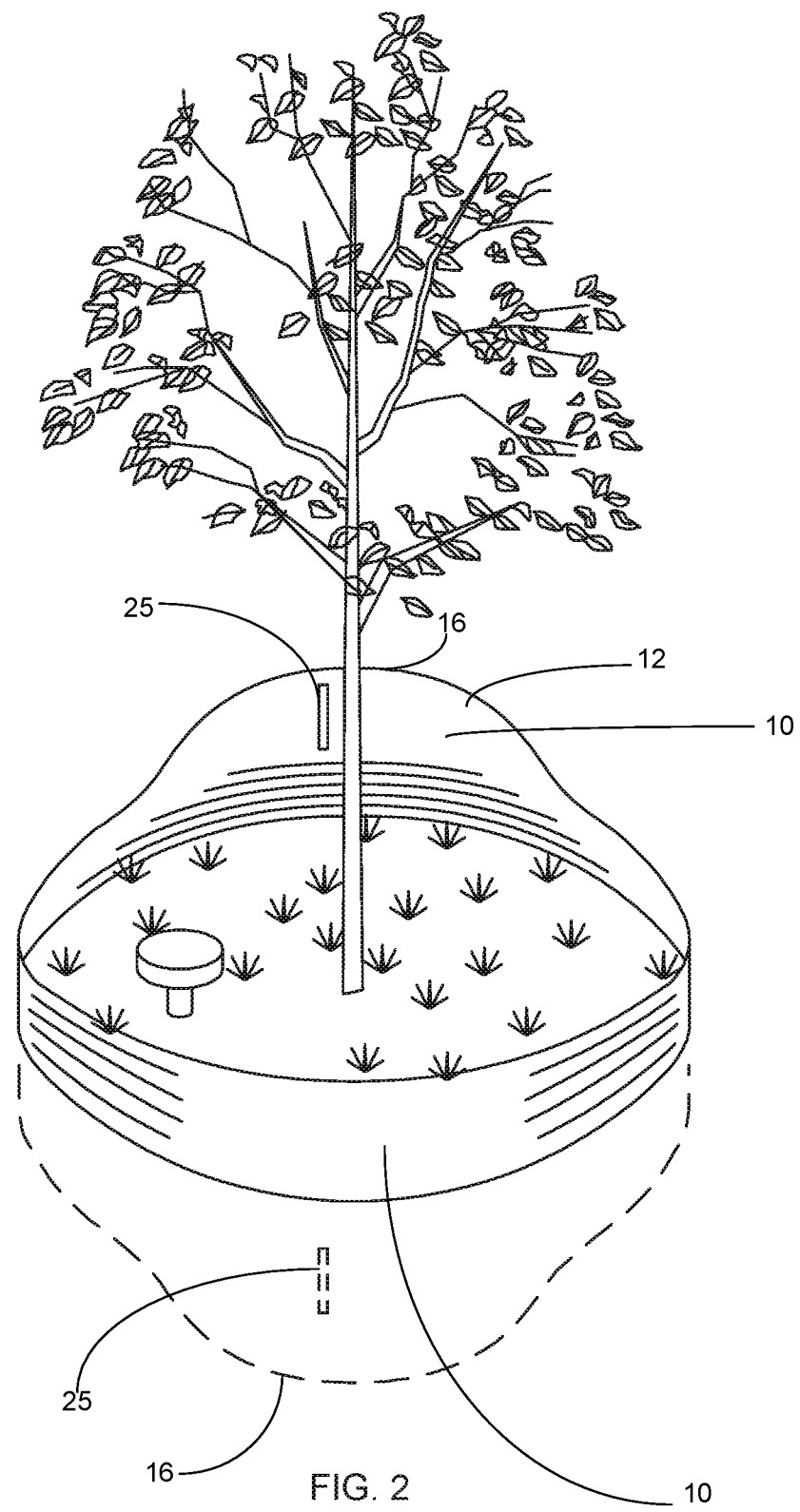
FIG. 2 is an exemplary configuration of the present invention.

Referring now to the drawings submitted herewith, wherein various elements depicted therein are not necessarily drawn to scale and wherein through the views and figures like elements are referenced with identical reference numerals, there is illustrated an umbrella anchor 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring now to FIG. 1 herein, the soil erosion barrier 100 includes body 10. The body 10 is planar in manner and is manufactured from a durable flexible material such as but not limited to plastic. The body 10 includes lower edge 12 and upper edge 14. Upper edge 14 extends intermediate the first end 15 and second end 20 and is straight in configuration. The lower edge 12 extends intermediate the first end 15 and second end 20 and is contoured in form. The lower edge 12 includes midpoint 16 wherein the body 10 at the midpoint 16 of the lower edge 12 is greatest in width. In opposing directions from the midpoint 16 the width of the body 10 tapers downward toward each end. As previously discussed herein, in installations of the soil erosion barrier 100 on sloped terrain, the aforementioned configuration of the lower edge 12 is operable to inhibit soil from egressing underneath the soil erosion barrier 100. It is contemplated within the scope of the present invention that the body 10 could be manufactured with alternate widths proximate the midpoint to accommodate various installations.

Figure 3:
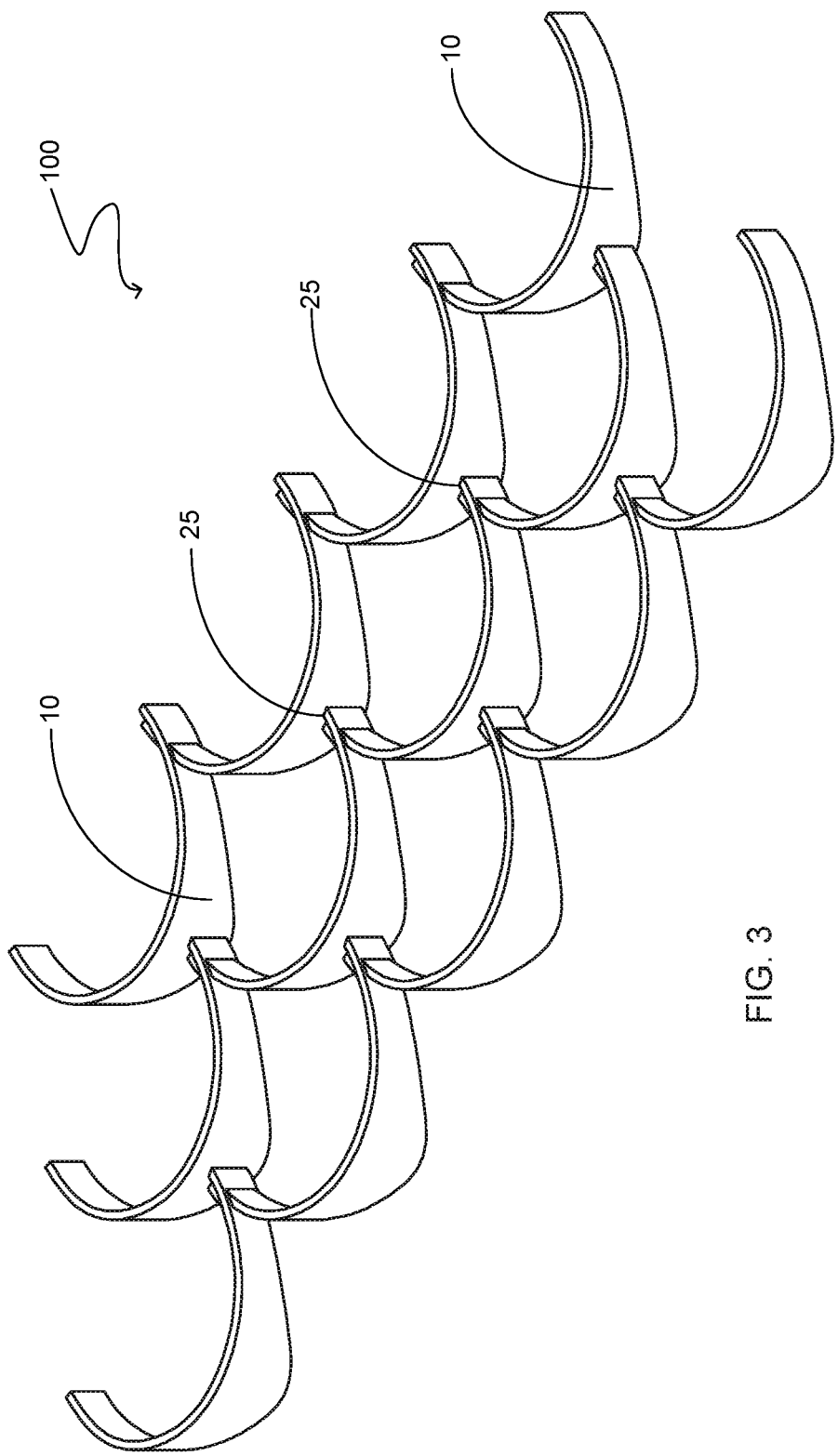
FIG. 3 is an alternate exemplary configuration of the present invention.

A slot 25 is formed in the body 10 proximate the midpoint 16 and is generally rectangular in shape. The slot 25 is provided so as to offer a connection technique in an installation of multiple soil erosion barriers 100 as is illustrated herein in FIG. 3. The slot 25 is of suitable size so as to accommodate a connection member 30 therein. While a slot 25 is illustrated and discussed herein for the purpose of providing a technique to operably couple multiple soil erosion barriers 100 it is contemplated within the scope of the present invention that the body 10 could have more than one slot 25 and further utilize alternate techniques to provide coupling of multiple soil erosion barriers 100.

Integrally formed with the first end 15 is neck portion 32. Neck portion 32 extends outward from the first end 15 and is axially aligned therewith. Neck portion 32 is manufactured having a width that is less than the width of the body 10 present at the first end 15 thereof. Contiguously formed with the neck portion 32 is a first connection member 35. The first connection member 35 includes an upper edge 36 and lower edge 37 that are contiguous with front edge 38. The first connection member 35 includes an upper rear edge 34 and a lower rear edge 39. The upper rear edge 34 and lower rear edge 39 are perpendicular to the neck portion 32 and facilitate the releasable securing of the first connection member 32 to either the slot 25 or with the aperture 50 as needed for a desire installation. The upper edge 36 and lower edge 37 are angularly beveled in order to facilitate coupling with the aperture 50 and/or slot 25. The width of the neck portion 32 creates a notch 40 that is operable to facilitate stacking and securing multiple soil erosion barriers 100.

Formed proximate the second end 20 of the body 10 is an aperture 50. The aperture 50 is square in shape and is configured to receive a connection member 30 therethrough. The aperture 50 includes opposing slots 52,54 formed on opposite sides of the aperture 50. The opposing slots 52,54 are configured so as to accommodate therethrough the connection member 30 wherein the connection member 30 is position so as to allow upper edge 36 and lower edge 37 journal through the opposing slots 52,54. Ensuing the insertion of the connection member 30 into the aperture 50 as described the upper rear edge 34 and lower rear edge 39 function to retain the connection member 30 within the aperture 50 as the combined length thereof is greater than the opening 55 of the aperture 50. While the aperture 50 is illustrated herein as being square in shape, it is contemplated within the scope of the present invention that the aperture 50 could be formed in alternate shapes. It is further contemplated within the scope of the present invention that the aperture 50 could be provided in alternate sizes so as to accommodate connection members 30 manufactured in alternate sizes.

Formed with the second end 20 is second neck portion 70 and second connection member 80. The second connection member 80 is formed similarly to that as described herein for the first connection member 35. Additionally, the second neck portion 70 is formed similarly as described herein for neck portion 32. The second connection member 80 provides the ability for multiple soil erosion barriers 100 to be operably coupled in various configurations as demonstrated in the drawings submitted herewith.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A soil erosion barrier configured to inhibit soil erosion on a sloped terrain, the soil erosion barrier comprising:

a body, said body being planar in manner, said body having a first end and a second end, said body having a lower edge, said body having an upper edge, said lower edge being contoured in shape intermediate said first end and said second end such that said body has a width proximate a midpoint that is greater than that of a width at the first end and the second end, said lower edge being tapered from said midpoint to said first end, said lower edge being tapered from said midpoint to said second end, wherein said body further includes a slot, said slot being perpendicular to said upper edge of said body, said slot being proximate said lower edge of said body, said slot being formed proximate the midpoint of said body;

a first connection member, said first connection member being integrally formed with said first end, said first connection member having an upper edge and a lower edge, said upper edge and said lower edge of said first connection member being angular in manner;

an aperture, said aperture being formed in said body proximate said second end, said aperture being square in shape, wherein said aperture further includes opposing slots, said opposing slots being formed with opposing sides of the aperture, said opposing slots operable to facilitate insertion of the first connection member;

a second connection member, said second connection member being integrally formed with said second end, said second connection member having an upper edge and a lower edge, said upper edge and said lower edge of said second connection member being angular in manner;

a first neck portion, said first neck portion being intermediate said first connection member and said first end of said body, said first neck portion being contiguous with said first end of said body, said first neck portion having a width that is less than the width of the body proximate the first end, said first neck portion extending outward from said first end, said first neck portion being centered on said first end of said body, said first neck portion forming a notch intermediate said first connection member and said first end of said body;

a second neck portion, said second neck portion being intermediate said second connection member and said second end of said body, said second neck portion being contiguous with said second end of said body and extending outward therefrom, said second neck portion having a width that is less than the width of the body proximate the second end, said second neck portion forming a notch intermediate said second connection member and said second end of said body; and wherein said first connection member and second connection member are utilized to place the soil erosion barrier in a first configuration and a second configuration.

2. The soil erosion barrier as recited in claim 1, wherein said first connection member further includes a lower rear edge and an upper rear edge, said upper rear edge and said lower rear edge configured to facilitate the releasable securing of the first connection member with said aperture.

3. The soil erosion barrier as recited in claim 2, wherein said body is manufactured from plastic.

* * * * *